United States Patent
Gaul et al.

(10) Patent No.: US 8,123,474 B2
(45) Date of Patent: Feb. 28, 2012

(54) REPAIR OF INDUSTRIAL GAS TURBINE NOZZLE DIAPHRAGM PACKING

(75) Inventors: Gregory R. Gaul, The Woodlands, TX (US); Gary O'Connor, Houston, TX (US)

(73) Assignees: Dresser-Rand Company, Olean, NY (US); Calpine Operating Services, Inc., Houston, TX (US)

( * ) Notice: Subject to any disclaimer, the term of this patent is extended or adjusted under 35 U.S.C. 154(b) by 294 days.

(21) Appl. No.: 12/464,684

(22) Filed: May 12, 2009

(65) Prior Publication Data

US 2010/0290902 A1     Nov. 18, 2010

(51) Int. Cl.
    *F01D 9/02*      (2006.01)

(52) U.S. Cl. ............... 415/191; 415/200; 415/209.2; 415/209.3; 29/889.1

(58) Field of Classification Search ............ 415/191, 415/200, 211.2, 209.2; 29/889.1
See application file for complete search history.

(56) References Cited

U.S. PATENT DOCUMENTS

| | | | |
|---|---|---|---|
| 3,300,180 A | 1/1967 | Tuttle et al. | |
| 4,832,252 A | 5/1989 | Fraser | |
| 4,889,470 A | 12/1989 | Scalzo | |
| 4,924,581 A * | 5/1990 | Jakobsen | 29/402.02 |
| 5,060,842 A | 10/1991 | Qureshi et al. | |
| 5,062,205 A | 11/1991 | Fraser | |
| 5,259,727 A | 11/1993 | Quinn | |
| 5,269,057 A * | 12/1993 | Mendham | 29/889.1 |
| 5,697,151 A | 12/1997 | Werner et al. | |
| 6,394,750 B1 * | 5/2002 | Hiskes | 415/189 |
| 6,568,077 B1 | 5/2003 | Hellemann et al. | |
| 6,892,931 B2 * | 5/2005 | Steplewski et al. | 228/119 |
| 7,008,170 B2 | 3/2006 | Proveaux et al. | |
| 7,179,052 B2 | 2/2007 | Sasaki et al. | |
| 7,484,928 B2 * | 2/2009 | Arness et al. | 415/115 |
| 7,556,475 B2 | 7/2009 | Roberts, III et al. | |
| 7,722,314 B2 | 5/2010 | Burdgick | |
| 7,762,783 B2 * | 7/2010 | Cairo et al. | 416/223 R |
| 2005/0172485 A1 * | 8/2005 | Mussen | 29/889.1 |
| 2007/0280820 A1 | 12/2007 | Roberts et al. | |
| 2008/0289179 A1 | 11/2008 | Pellet et al. | |
| 2009/0229101 A1 * | 9/2009 | Ahmad et al. | 29/402.18 |

OTHER PUBLICATIONS

Cocca et al.; "Performance and Reliability Improvements for MS5002 Gas Turbines (GER-4171);" General Electric Company; Date Unknown; 26 pages.
Scoretz et al.; "Industrial Steam Turbine Value Packages (GER-4191A);" General Electric Company; Dec. 2005; 32 pages.
Brandt et al.; "GE Gas Turbine Design Philosophy (GER-3434D);" General Electric Company; Sep. 1994; 26 pages.
Pallos; "Gas Turbine Repair Technology (GER-3957B);" General Electric Company; Apr. 2001; 30 pages.
Gill; "Uprate Options for the MS9001 Heavy-Duty Gas Turbine GER-3928B);" General Electric Company; Date Unknown; 25 pages.

(Continued)

*Primary Examiner* — Ninh H Nguyen
(74) *Attorney, Agent, or Firm* — Edmonds & Nolte, PC (57) ABSTRACT

A technique for refurbishing nozzle diaphragm sections of a gas turbine replaces an eroded section of the nozzle diaphragm with a replacement part designed to engage a slot machined in the nozzle diaphragm. The replacement part is formed of a material with capable of sustained exposure to higher temperature than the original eroded section, and with a similar coefficient of expansion as the material used for manufacture the original nozzle diaphragm. The combination of the nozzle diaphragm and the replacement part conform to the original manufacturer's dimensional specifications for the nozzle diaphragm.

20 Claims, 7 Drawing Sheets

OTHER PUBLICATIONS

Ginter et al.; "Uprate Options for the MS7001 Heavy Duty Gas Turbine (GER-3808C);" General Electric Company; Dec. 2006; 68 pages.

Johnston; "Performance and Reliability Improvements for Heavy-Duty Gas Turbines (GER-3571H);" General Electric Company; Oct. 2000; 50 pages.

Schilke; "Advanced Gas Turbine Materials and Coatings (GER-3569G);" General Electric Company; Aug. 2004; 30 pages.

PCT/US2010/034425 Notification of Transmittal of the International Search Report and the Written Opinion of the International Searching Authority, or the Declaration, dated Jul. 15, 2010.

K.J. Pallos, Gas Turbine Repair Technology, GE Power Systems, Apr. 2001, pp. 1-30, Atlanta, GA.

* cited by examiner

REPAIR OF INDUSTRIAL GAS TURBINE NOZZLE DIAPHRAGM PACKING

TECHNICAL FIELD

The present invention relates to the field of gas turbines, and in particular to a technique for refurbishing gas turbines.

BACKGROUND ART

In a gas turbine, gas is typically produced by the combustion of fuel. The gas is then passed over a collection of stationary nozzles, which discharge jets of gas against the blades of a turbine rotor, forcing the rotor to rotate. The rotation of the rotor drives the external load of the turbine, such as an electrical generator.

One problem with gas turbines is that the high temperatures in the turbine eventually cause degradation, such as burning, of packings or diaphragms, where the diaphragms are connected to the nozzles.

SUMMARY OF INVENTION

A technique for refurbishing nozzle diaphragm sections of a gas turbine replaces an eroded section of the nozzle diaphragm with a replacement part designed to engage a slot machined in the nozzle diaphragm. The replacement part is formed of a material that is capable of sustained exposure to higher temperature than the original eroded section, and with a similar coefficient of expansion as the material used for manufacture the original nozzle diaphragm. The combination of the nozzle diaphragm and the replacement part conform to the original manufacturer's dimensional specifications for the nozzle diaphragm.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Figure 1:
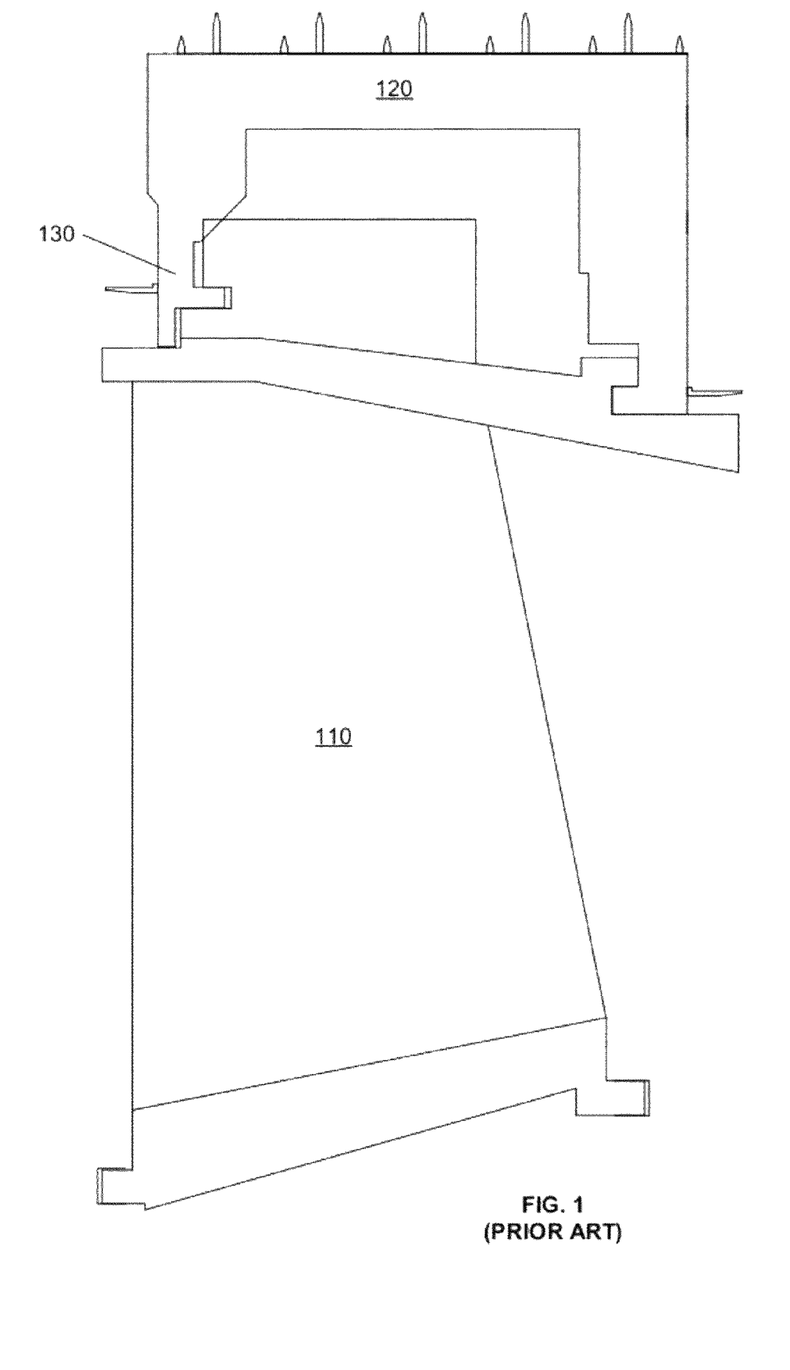
FIG. 1 is a lateral view of a conventional gas turbine nozzle segment and attached diaphragm segment.

As stated above, a problem with some gas turbines, such as the General Electric Frame 7FA gas turbine, is that they operate at a temperature that can exceeds the ability of the materials used by the original equipment manufacturer to make the diaphragm. A conventional gas turbine nozzle is typically comprised of a plurality of nozzle segments 110, each of which has an associated diaphragm or packing member 120 attached to the nozzle segment, such as shown in FIG. 1.

The nozzle segment 110 is typically manufactured from a high-temperature nickel-based superalloy or other similar material selected for its ability to withstand the high temperatures of hot gas in the turbine, which can reach approximately 2000° F. (1090° C.). The diaphragm 120 is attached radially interior to the vanes of the nozzle segment and forms an air seal around the rotor.

Because the diaphragm segments 120 are not directly exposed to the hot turbine gas, they are typically manufactured from a lower temperature material, such as a cast nickel-iron known in the art as a Ni-Resist (ASTM 439), which is an austenitic cast iron that is often used for heat and corrosion resistant applications. Although the diaphragm 120 is not directly exposed to the high heat, due to heat conduction through the nozzle segment 110 where the diaphragm 120 attaches to the nozzle segment 110, the diaphragm segments 120 often exceed the temperature limits of the Ni-Resist material, typically approximately 1500° F. (815° C.). The excessive temperature causes oxidation and erosion of the diaphragm segments 120, most commonly in the aft hook area 130, sometimes referred to as a rail section, where the diaphragm segment 120 attaches to the nozzle segment 110. This oxidation and erosion, sometimes referred to as burning of the rail section is typically discovered when the turbine is taken out of service for repair and refurbishment. Although the disclosure below and in the drawings is set forth using a replacement for the aft hook area 130, the techniques disclosed herein can be employed to replace other heat-damaged areas of the diaphragm 120, as needed.

Some refurbishers have repaired the eroded rail surface by machining the eroded surface to remove the eroded and corroded portions, welding on additional Ni-Resist material, and remachining the diaphragm 120 to the original equipment manufacturer's dimensional specifications. Such a technique is difficult to perform, because the casting porosity and heavy oxidation of the Ni-Resist material makes it difficult to weld. Furthermore, the conventional welding refurbishment technique does not permanently solve the problem, and the diaphragm is subject to the same erosion and oxidation, because the repair does not solve the problem of the excessive temperature. Thus, the repaired diaphragm may develop the same erosion and oxidation as before, requiring redoing the repair procedure.

Others have replaced the entire diaphragm section 120 with a replacement diaphragm section manufactured from a higher temperature material, such as a stainless steel. While the replacement diaphragm made of stainless steel is capable of withstanding higher temperatures than the Ni-Resist material, the cost of replacing the diaphragm with a new diaphragm made of stainless steel is undesirably high, because of the higher materials and manufacturing costs for the stainless steel diaphragm, as well as the waste of the original diaphragm, which in most part is not subject to the higher temperatures, and does not suffer the erosion and oxidation as a result, and does not need the higher-temperature material.

Figure 2:
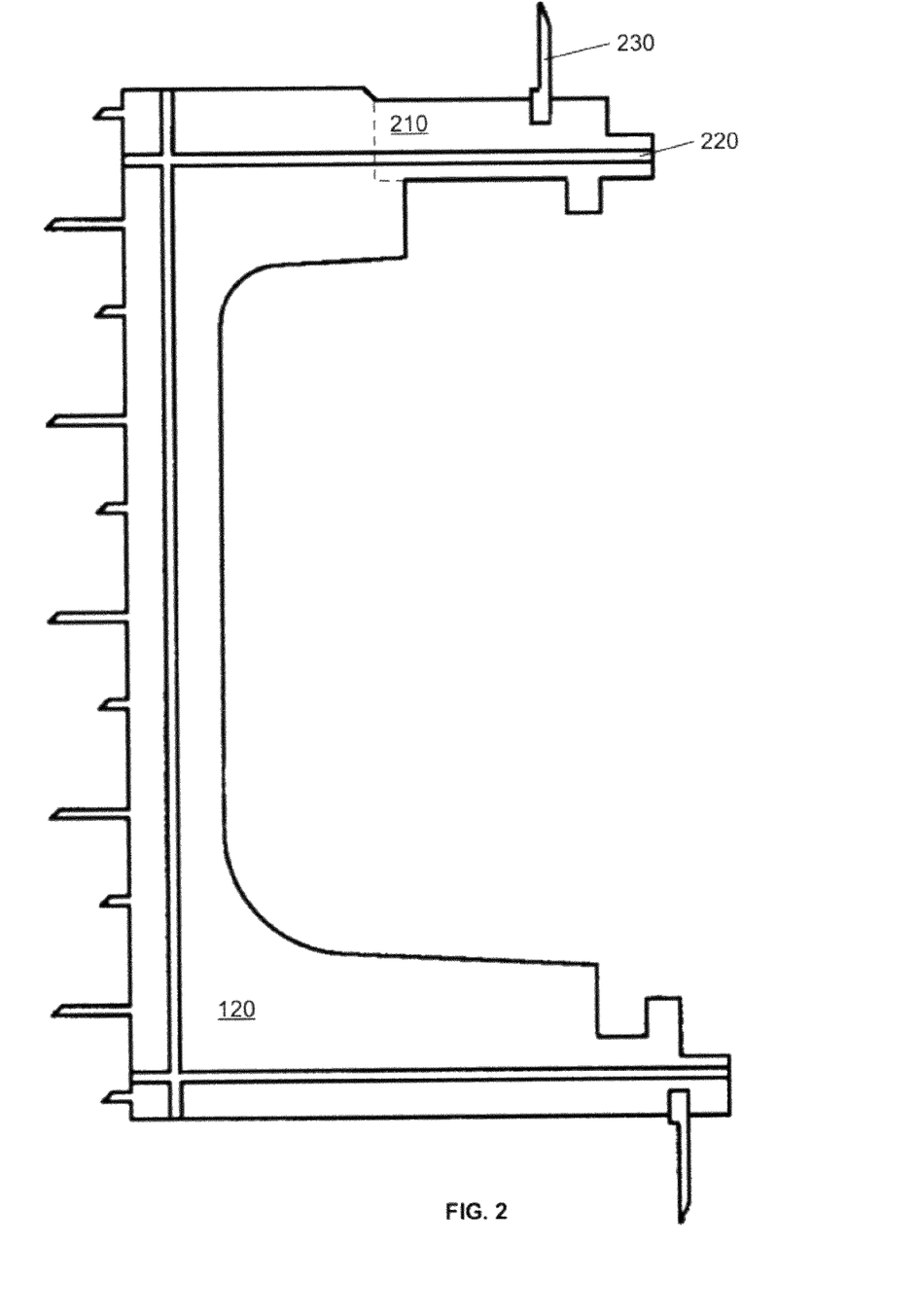
FIG. 2 is a lateral view of the gas turbine diaphragm segment of FIG. 1, illustrating a section to be machined off and replaced during refurbishment.
Figure 3:
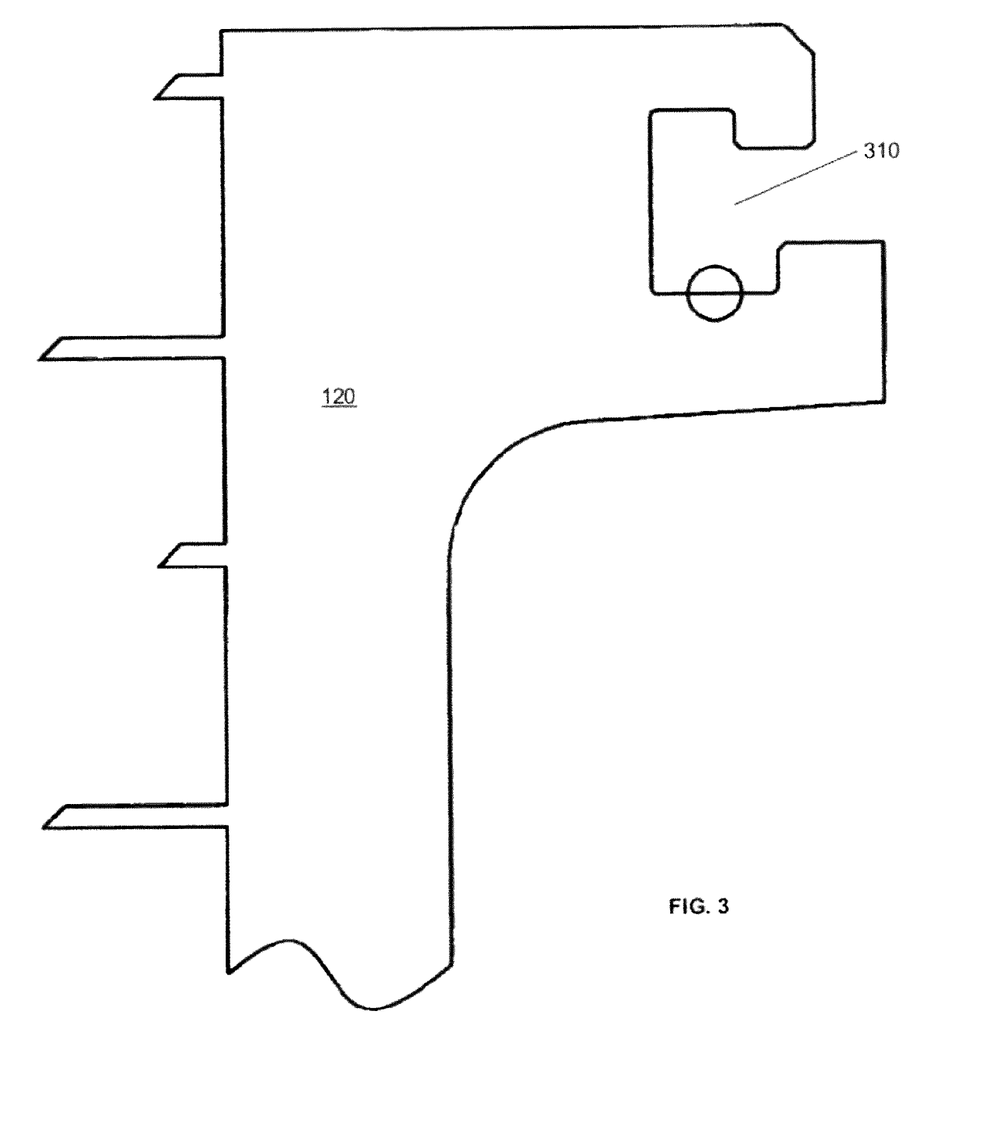
FIG. 3 is a lateral closeup view of the gas turbine diaphragm segment of FIG. 2, after removal of the rail section.
Figure 4:
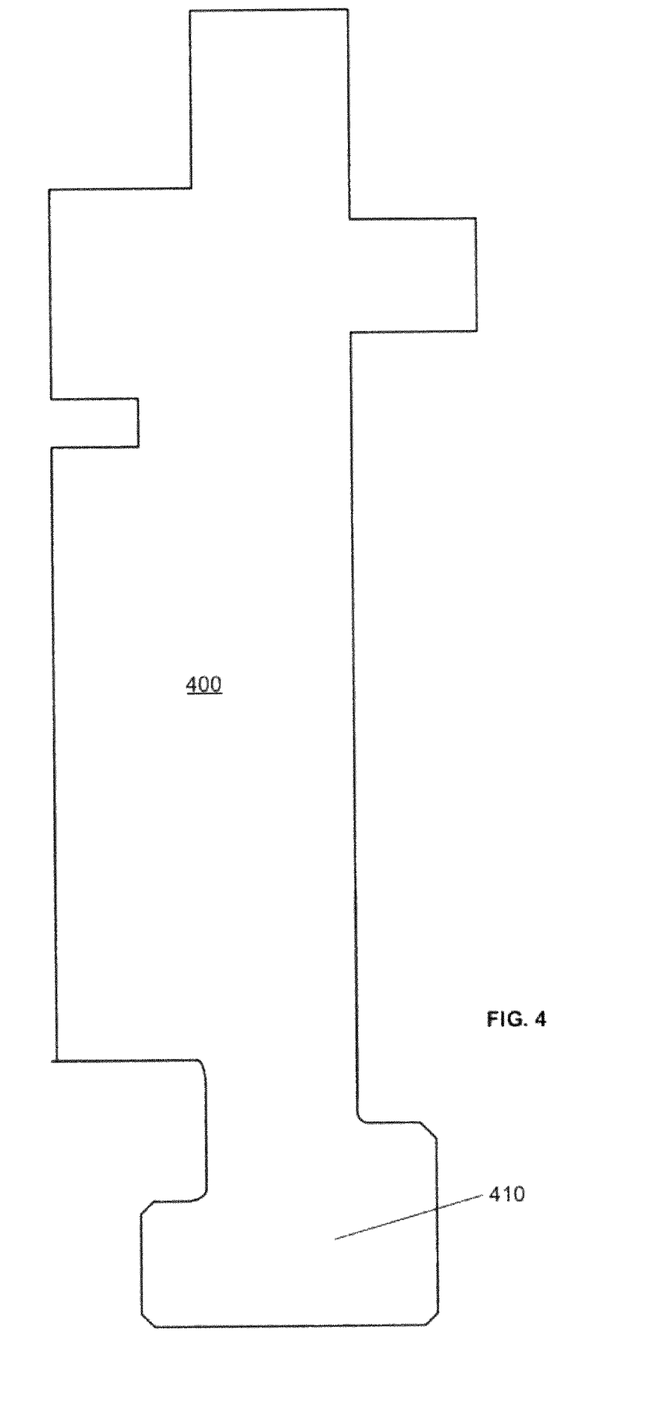
FIG. 4 is a lateral view of a replacement rail section according to one embodiment.

As disclosed herein, embodiments of the present invention avoid the high costs of a complete replacement and the lack of durability and difficulty of an original material Ni-Resist material repair. A portion 210 of the aft hook section 130 of the diaphragm 120 (indicated in FIG. 2 with a dashed line, is machined off, removing the area of erosion and corrosion. The removed portion 210 is typically larger than the actual area of erosion and oxidation. Then, as illustrated in FIG. 3, a slot 310 is milled longitudinally into the diaphragm segment 120. FIG. 3 illustrates one embodiment of the slot 310, an approximately T-shaped slot. The slot configuration of FIG. 3 is illustrative and by way of example only, and other slot shapes can be used.

Figure 5:
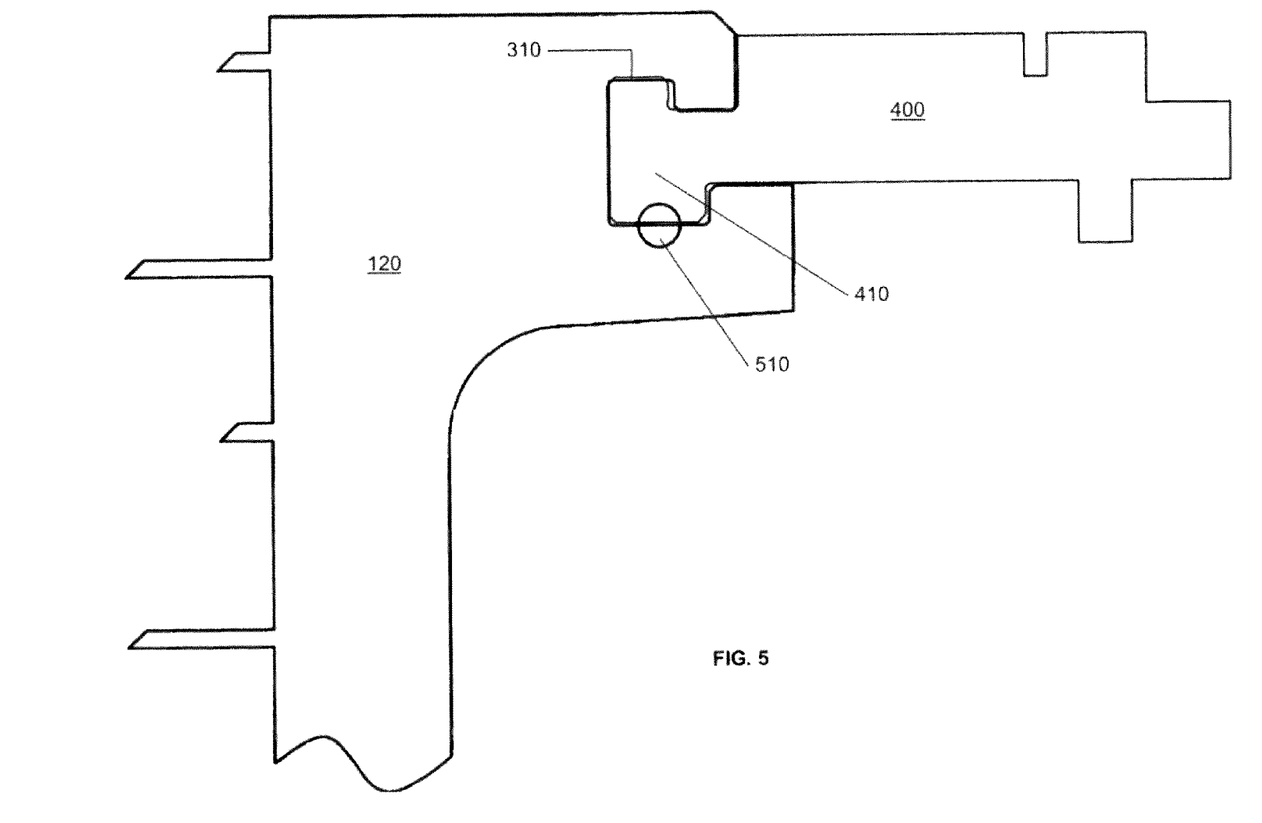
FIG. 5 is lateral view of the replacement rail section of FIG. 4 fitted into the gas turbine diaphragm segment of FIG. 3.

A replacement rail insert section 400 is machined, typically from a solid block of a stainless steel material. Most of the rail insert section 400 is machined or milled to match the configuration of the section 210 of the diaphragm 120 that was eroded and removed as described above. But a tab section 410 is machined to match the T-slot 310 in the diaphragm 120 illustrated in FIG. 3. Turning to FIG. 5, the rail insert 400 is illustrated inserted into the diaphragm 120, with the T-slot 310 filled by the tab section 410. The use of a matching T-slot 310 and tab 410 helps provide structural stability for the refurbished diaphragm 120. Although as described above the replacement section 400 is machined to the desired configuration, other techniques for forming the replacement section 400 can be used, such as casting or forging.

In some embodiments, the rail insert 400 is machined roughly the same width as but slightly wider than the diaphragm section 120, then further machined in place after assembly to better match the diaphragm section 120, providing a smooth interface where the tab 410 engages the slot 310. A retainer screw 510 can be used at either end or both ends of the tab-slot interface to hold the rail insert section 400 in place, preventing motion relative to the diaphragm 120.

Figure 6:
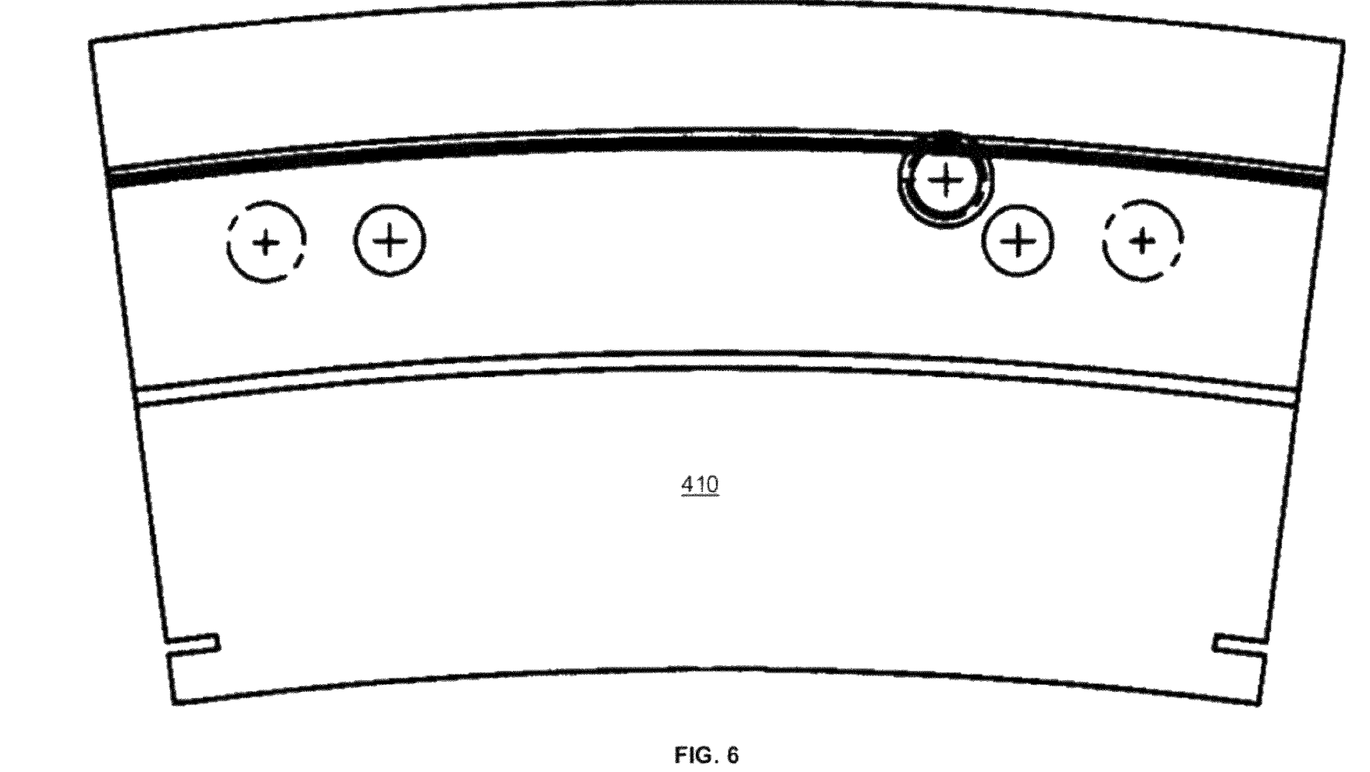
FIG. 6 is a bottom view of the replacement rail section of FIG. 4.
Figure 7:
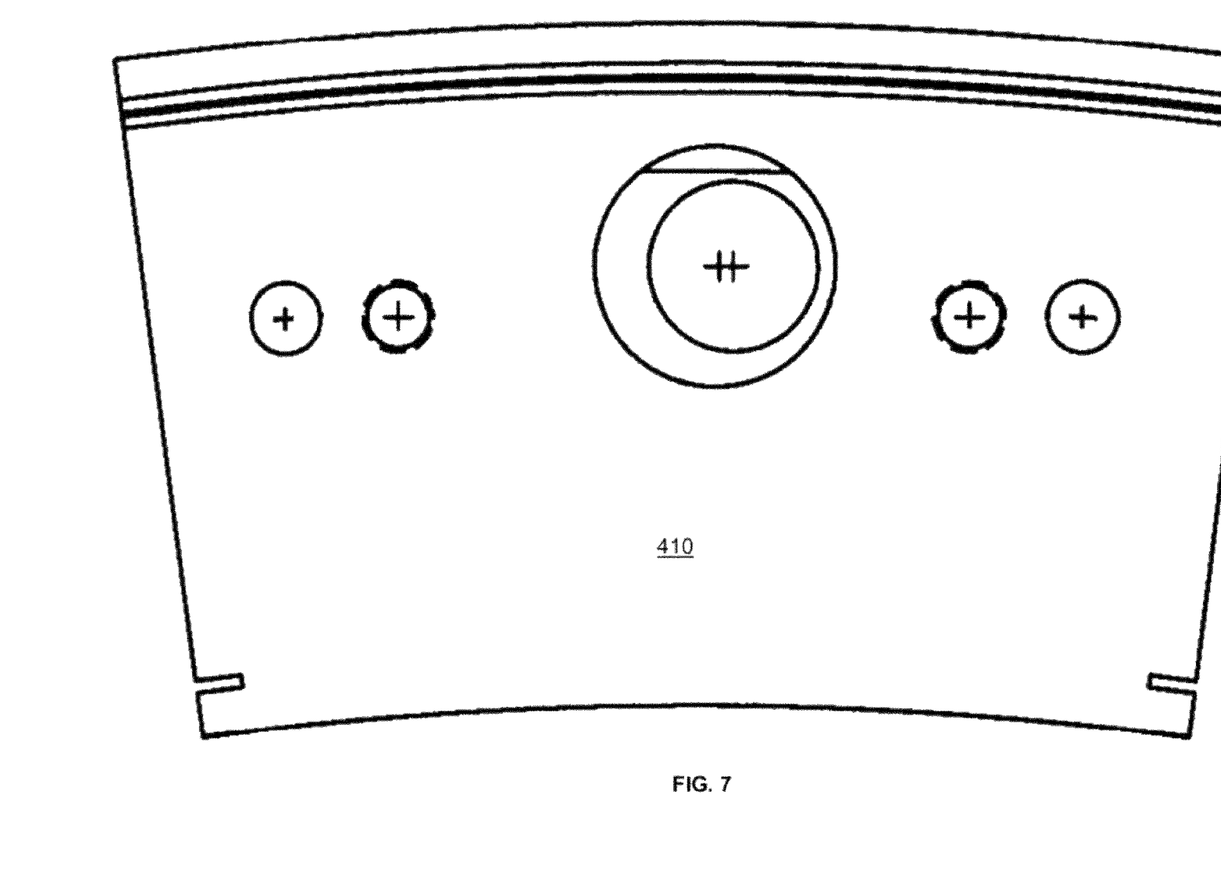
FIG. 7 is a top view of the replacement rail section of FIG. 4.

As illustrated in top view in FIGS. 6 and 7, the rail insert is curved to match the curvature of the diaphragm section 120. In addition, as is also illustrated in FIGS. 6 and 7, other tooling holes for sensors, screws, or other fasteners can be drilled or otherwise formed in the rail insert section 400 as desired.

If necessary or desired, other openings can be formed or machined in the rail insert 400 for allowing placement of sensors or other conventional elements as used in the original diaphragm section 120 before refurbishment. Where seals, such as the seal 230 of FIG. 2, or slots such as the inter-section seal slot 220 also shown in FIG. 2 were present in the original diaphragm section 120, the rail section insert 400 is milled, drilled, or otherwise configured to provide for such seals or slots, to conform to the original configuration of the diaphragm 120. The resulting assembly thus meets the original equipment manufacturer's specifications for the diaphragm section 120, even though the rail insert section 400 is of a different material than originally specified, and is capable of withstanding the higher temperatures.

The rail insert 400 is preferably manufactured from a block of material. The material used is selected for its ability to sustain high temperatures and with a similar coefficient of expansion as the Ni-Resist material used in the diaphragm 120. In one embodiment, the rail insert 400 is manufactured from a stainless steel, such as a type 310 stainless steel. The resulting refurbished nozzle segment and diaphragm is then reassembled with other such segments into the turbine nozzle. Depending on the damage observed or discovered when the turbine nozzle was disassembled for refurbishment, any number of the diaphragm segments 120 can be refurbished as described above, providing a refurbished gas turbine nozzle at a lower cost and with less wasted materials than a complete replacement with higher temperature material, but providing improved durability over a conventional repair procedure that replaces eroded material with the original material.

While certain exemplary embodiments have been described in details and shown in the accompanying drawings, it is to be understood that such embodiments are merely illustrative of and not devised without departing from the basic scope thereof, which is determined by the claims that follow.

We claim:

1. A method of refurbishing a gas turbine, comprising:
   removing an eroded section of a nozzle diaphragm formed of a first material;
   machining a slot in the nozzle diaphragm corresponding to the removed eroded section;
   forming a replacement section corresponding to the removed eroded section from a second material, the replacement section configured to engage the slot for attachment with the nozzle diaphragm; and
   engaging the replacement section with the slot of the nozzle diaphragm.

2. The method of claim 1, further comprising:
   preventing relative movement of the nozzle diaphragm and the replacement section with a set screw.

3. The method of claim 1, further comprising:
   forming the replacement section larger than the removed eroded section; and
   machining the replacement section after engagement with the nozzle diaphragm to conform to the nozzle diaphragm.

4. The method of claim 1, wherein the slot is approximately T-shaped.

5. The method of claim 1, further comprising:
   selecting the second material to have a coefficient of expansion similar to that of the first material.

6. The method of claim 1, further comprising:
   selecting the second material to be capable of withstanding sustained higher temperatures than the first material.

7. A replacement section for a gas turbine nozzle diaphragm, the diaphragm formed of a first material, an eroded section of the diaphragm having been removed, the replacement section comprising:
   an aft hook section formed of a second material and configured to conform to an original equipment manufacturer's specification for an aft hook of the diaphragm; and
   a tab section formed of the second material and configured to engage with a corresponding slot in the diaphragm.

8. The replacement part of claim 7, wherein the aft hook section and the tab section are formed from a single block of the second material.

9. The replacement part of claim 7, wherein the second material is selected to have a similar coefficient of expansion as the first material.

10. The replacement part of claim 7, wherein the second material is selected to withstand exposure to a higher temperature than the first material.

11. The replacement part of claim 7, wherein the second material is a type 310 stainless steel.

12. The replacement part of claim 7, wherein the tab section has an approximately T-shaped cross-section.

13. A refurbished nozzle diaphragm for a gas turbine, comprising:
   an unrefurbished nozzle diaphragm formed of a first material, wherein an eroded section of the nozzle diaphragm has been removed;
   a slot formed where the eroded section of the unrefurbished nozzle diaphragm was removed; and
   a replacement member, formed of a second material, comprising:
      a replacement section; and
      a tab section connected to the replacement section and configured to engage with the slot, wherein the unrefurbished nozzle diaphragm and the replacement member engaged together conform to an original equipment manufacturer's dimensional specifications for the unrefurbished nozzle diaphragm.

14. The refurbished nozzle diaphragm of claim 13, wherein the second material is selected to have a similar coefficient of expansion as the first material.

15. The refurbished nozzle diaphragm of claim 13, wherein the second material is selected to withstand exposure to a higher temperature than the first material.

16. The refurbished nozzle diaphragm of claim 13, wherein the second material is a stainless steel.

17. The refurbished nozzle diaphragm of claim 13, wherein the removed eroded section was an aft hook section of the unrefurbished nozzle diaphragm.

18. The refurbished nozzle diaphragm of claim 13, wherein the slot has an approximately T-shaped cross-section.

19. The refurbished nozzle diaphragm of claim 13, further comprising:
a set screw, positioned at an interface between the unrefurbished nozzle diaphragm and the replacement member, configured to prevent relative movement of the unrefurbished nozzle diaphragm and the replacement member.

20. The refurbished nozzle diaphragm of claim 13, wherein the slot and the tab section have corresponding approximately T-shaped cross-sections.

* * * * *